United States Patent
Kim et al.

(10) Patent No.: US 9,538,080 B2
(45) Date of Patent: Jan. 3, 2017

(54) DIGITAL PHOTOGRAPHING APPARATUS, METHODS OF CONTROLLING THE SAME, AND COMPUTER-READABLE STORAGE MEDIUM TO INCREASE SUCCESS RATES IN PANORAMIC PHOTOGRAPHY

(71) Applicant: SAMSUNG ELECTRONICS CO., LTD., Suwon-si, Gyeonggi-do (KR)

(72) Inventors: Kun-sop Kim, Yongin-si (KR); Seung-kyoon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/884,051

(22) Filed: Oct. 15, 2015

(65) Prior Publication Data

US 2016/0037069 A1    Feb. 4, 2016

Related U.S. Application Data

(63) Continuation of application No. 14/571,627, filed on Dec. 16, 2014, now Pat. No. 9,172,872, which is a continuation of application No. 13/343,179, filed on Jan. 4, 2012, now Pat. No. 8,922,620.

(30) Foreign Application Priority Data

Jun. 20, 2011  (KR) .................. 10-2011-0059647

(51) Int. Cl.
H04N 5/232    (2006.01)
H04N 5/235    (2006.01)

(52) U.S. Cl.
CPC ........ H04N 5/23238 (2013.01); H04N 5/2353 (2013.01); H04N 5/23293 (2013.01)

(58) Field of Classification Search
CPC .......................... H04N 5/23238; H04N 5/2624
See application file for complete search history.

(56) References Cited

U.S. PATENT DOCUMENTS

| | | | | |
|---|---|---|---|---|
| 8,922,620 B2* | 12/2014 | Kim | ............... | H04N 5/23238 348/36 |
| 9,172,872 B2* | 10/2015 | Kim | ............... | H04N 5/23238 |
| 2005/0276596 A1 | 12/2005 | Chan et al. | | |
| 2008/0030585 A1* | 2/2008 | Grigorian | .......... | H04N 5/23206 348/208.4 |
| 2008/0074489 A1 | 3/2008 | Zhang et al. | | |
| 2008/0158342 A1* | 7/2008 | Jeong | ................. | G03B 37/04 348/36 |
| 2008/0192125 A1* | 8/2008 | Kang | ................. | H04N 5/232 348/222.1 |
| 2008/0312824 A1 | 12/2008 | Jung | | |
| 2009/0021576 A1 | 1/2009 | Linder et al. | | |
| 2011/0193941 A1* | 8/2011 | Inaba | ................. | G03B 35/14 348/46 |
| 2011/0249146 A1 | 10/2011 | Ishida | | |

* cited by examiner

*Primary Examiner* — Huy T Nguyen
(74) *Attorney, Agent, or Firm* — Drinker Biddle & Reath LLP

(57) ABSTRACT

Digital photographing apparatus, methods of controlling the same, and computer-readable storage medium to increase success rates in panoramic photography are disclosed. A method of controlling a digital photographing apparatus is provided that includes initiating panoramic photography, and providing a capture guide when an image is captured during the panoramic photography.

23 Claims, 7 Drawing Sheets

DIGITAL PHOTOGRAPHING APPARATUS, METHODS OF CONTROLLING THE SAME, AND COMPUTER-READABLE STORAGE MEDIUM TO INCREASE SUCCESS RATES IN PANORAMIC PHOTOGRAPHY

CROSS-REFERENCE TO RELATED PATENT APPLICATIONS

This application is a continuation of U.S. patent application Ser. No. 14/571,627, filed Dec. 16, 2014, now U.S. Pat. No. 9,172,872, which is a continuation of U.S. patent application Ser. No. 13/343,179, filed Jan. 4, 2012, now U.S. Pat. No. 8,922,620, which claims the priority benefit of Korean Patent Application No. 10-2011-0059647, filed on Jun. 20, 2011, in the Korean Intellectual Property Office, the disclosures of which are incorporated herein in their entirety by reference.

BACKGROUND

1. Field

Embodiments of the invention relate to a digital photographing apparatus, methods of controlling the same, and computer-readable storage medium to increase success rates in panoramic photography.

2. Description of the Related Art

A digital photographing apparatus receives and converts optical signals into electrical signals to generate photographic images. Some recent digital photographing apparatuses provide continuous shooting, panoramic photography, and various photographic functions by adopting various filtering effects, thus increasing ease of use as well as user satisfaction.

SUMMARY

Embodiments of the invention increase success rates in panoramic photography in a digital photographing apparatus.

According to an aspect of the invention, there is provided a method of controlling a digital photographing apparatus, including initiating panoramic photography, and providing a capture guide when an image is captured during the panoramic photography.

The panoramic photography may be performed using an electronic shutter.

The capture guide may be a capture sound.

The method may further include, during the panoramic photography, providing a movement guide for the digital photographing apparatus.

Providing the capture guide may include displaying a panoramic progress guide that indicates a progress status for the panoramic photography, changing the panoramic progress guide when the image is captured, and outputting a capture sound in synchronization with changing the panoramic progress guide when the image is captured.

The method may further include providing a live-view image, wherein providing the capture guide comprises displaying a panoramic progress guide in the live-view image that indicates a progress status for the panoramic photography, changing the panoramic progress guide when the image is captured, and outputting a capture sound in synchronization with changing the panoramic progress guide when the image is captured.

According to another aspect of the invention, there is provided a digital photographing apparatus including: a photography unit configured to generate an electronic image signal from an optical signal; a photography controller configured to control the photography unit to perform panoramic photography; and a panoramic photography guide unit configured to provide a capture guide as images are captured during the panoramic photography.

The photography unit may be further configured to conduct the panoramic photography using an electrical shutter.

The capture guide may be a capture sound.

The panoramic photography guide unit may be further configured to provide a movement guide for the digital photographing apparatus.

The panoramic photography guide unit may be further configured to display a panoramic progress guide that indicates a progress status for the panoramic photography, change the panoramic progress guide as the images are captured, and output a capture sound in synchronization with changing the panoramic progress guide.

The digital photographing apparatus may further include a live-view providing unit configured to provide a live-view image, wherein the panoramic photography guide unit is to display a panoramic progress guide in the live-view image that indicates a progress status for the panoramic photography, change the panoramic progress guide as the images are captured, and output a capture sound in synchronization with changing the panoramic progress guide.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

The following descriptions and accompanying drawings are provided to facilitate an understanding of the invention. Details that are readily apparent to one of ordinary skill in the art in view of the disclosure might be omitted to avoid obscuring aspects of the invention.

The description and drawings are not intended to limit the invention, but the scope of the invention should be defined by attached claims. Terms, used herein, should be construed to have meanings suitable to the technical area of the invention.

Hereinafter, exemplary embodiments of the invention will be described below with reference to the accompanying drawings.

Figure 1:
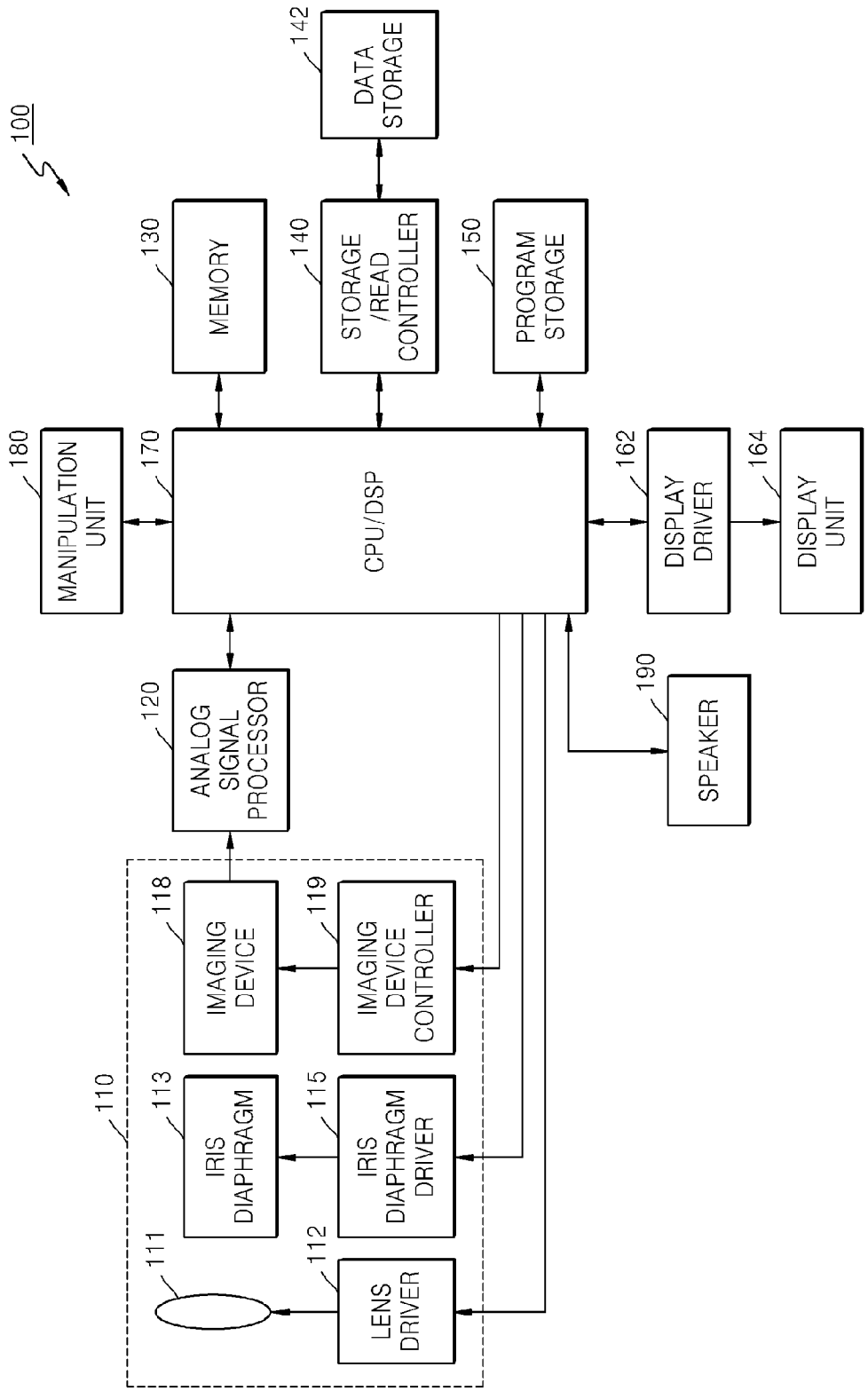
FIG. 1 is a block diagram of a digital photographing apparatus, according to an embodiment of the invention.

FIG. 1 is a block diagram of a digital photographing apparatus 100, according to an embodiment of the invention.

The digital photographing apparatus 100 includes a photography unit 110, an analog signal processor 120, memory 130, a storage/read controller 140, data storage 142, program storage 150, a display driver 162, a display unit 164, a CPU/DSP 170, a manipulation unit 180, and a speaker 190.

Operations of the digital photographing apparatus 100 are controlled by the CPU/DSP 170. The CPU/DSP 170 provides control signals to a lens driver 112, an iris diaphragm driver 115, an imaging device controller 119, etc. to operate a lens 111, an iris diaphragm 113, and an imaging device 118.

The photography unit 110 includes the lens 111, the lens driver 112, the iris diaphragm 113, the iris diaphragm driver 115, the imaging device 118, and the imaging device controller 119 to create images represented by electrical signals from incident light rays.

The lens 111 may include a plurality of lenses or groups of lenses. A position of the lens 111 is controlled by the lens driver 112. The lens driver 112 adjusts the position of the lens 111 based on a control signal provided by the CPU/DSP 170.

The extent of opening and closing the iris diaphragm 113 is controlled by the iris diaphragm driver 115, and thus the amount of light rays to be incident on the imaging device 118 may be adjusted.

An optical signal that has passed through the lens 111 and the iris diaphragm 113 arrives at a light-receiving surface of the imaging device 118, and a picture of an object is formed on the light-receiving surface. The imaging device 118 may be a charge-coupled device (CCD) image sensor or a complementary metal-oxide semiconductor image sensor (SIS), which converts optical signals into electrical signals. The imaging device 118 is controlled by the imaging device controller 119 to adjust sensitivity, for example. The imaging device controller 119 may control the imaging device 118 based on a control signal that is automatically created according to a real-time input image signal, or based on a control signal that is manually input by a user's manipulation.

Light-exposure time of the imaging device 118 is adjusted by a shutter (not shown). The shutter may be a mechanical shutter that adjusts the amount of incident light rays by moving a shade, or an electronic shutter that controls light-exposure by supplying electrical signals to the imaging device 118.

The analog signal processor 120 may perform a noise reduction process, a gain adjustment process, a waveform shaping process, an analog-to-digital conversion process, or the like on an analog signal supplied from the imaging device 118.

A resulting signal from the analog signal processor 120 may be input to the CPU/DSP 170 directly or through the memory 130. Here, the memory 130 serves as a main memory of the digital photographing apparatus 100, and temporarily stores information necessary for operation of the CPU/DSP 170. The program storage 150 stores programs, such as, an operating system to operate the digital photographing apparatus 100, an application system, etc.

In addition, the digital photographing apparatus 100 includes the display unit 164 for displaying an operation status of the digital photographing apparatus 100, images, or information about images captured by the digital photographing apparatus 100. The display unit 164 may provide visual and/or audible information to a user. To provide the visual information, the display unit 164 may include a liquid crystal display (LCD) panel, an organic light-emitting diode (OLED) panel, etc., for example. Furthermore, the display unit 164 may be a touch screen capable of detecting touch inputs.

The display driver 162 provides the display unit 164 with driving signals.

The CPU/DSP 170 processes input image signals, and controls each component of the digital photographing apparatus 100 according to the processed input image signals, or according to an external signal. The CPU/DSP 170 may, for example, reduce noise in an input image signal and perform image signal processing, such as, gamma correction, color filter array interpolation, color matrix, color correction, color enhancement, etc. to improve image quality. Furthermore, the CPU/DSP 170 may compress the thus processed image data to create an image file, or may reconstruct image data from image files. An image compression format may be a reversible or a non-reversible format. For example, a still image may be compressed in accordance with a Joint Photographic Experts Group (JPEG) format or a JPEG 2000 format. In addition, a moving picture file may be created by compressing a plurality of frames according to, for example, a Moving Picture Experts Group (MPEG) standard. Image files may be created according to the Exchangeable image file format (Exif) standard, for example.

Image data output from the CPU/DSP 170 is input to the storage/read controller 140 directly or via the memory 130, and the storage/read controller 140 stores the image data in the data storage 142 automatically or in response to a user's signal. The storage/read controller 140 also reads data associated with images from image files stored in the data storage 142, and inputs the data to the display driver 162 via the memory 130 or through some other components of the digital photographing apparatus 100 so that images may be displayed on the display unit 164. The data storage 142 may be removable from or permanently disposed in the digital photographing apparatus 100.

Furthermore, the CPU/DSP 170 may perform obscurity, coloring, blurriness, edge emphasis, image analysis, image recognition, image effect, etc. processing. Examples of an image recognition process include a face recognition process, a scene recognition process, etc. The CPU/DSP 170 may also perform a display process on an image signal to be displayed on the display unit 164. For example, the CPU/DSP 170 may perform luminescence level adjustment, color correction, contrast adjustment, edge emphasis adjustment, screen divisional processing, image creation such as a character image, image synthesizing, etc. The CPU/DSP 170 may be connected to an external monitor, and may perform a display process on an image, and transmit the processed image to be displayed thereon.

Additionally, the CPU/DSP 170 may execute a program stored in the program storage 150, or may create control signals for controlling auto focusing, zooming change, focus change, automatic exposure compensation, etc. to be provided to the iris diaphragm driver 114, the lens driver 112, the imaging device controller 119, and to control operations of other components such as a shutter, a Strobo, etc. which are equipped in the digital photographing apparatus 100.

The manipulation unit 180 is a unit via which a user may input control signals. The manipulation unit 180 may include a variety of buttons including a shutter-release button to input a shutter-release signal that allows the imaging device 118 to be exposed to light for a predetermined period of time to take a picture, a power button to input a control signal for controlling power-on/off, a zoom button to widen or narrow an angle of view according to an input, a mode selection button, a button for adjusting other photography settings, etc. The manipulation unit 180 may be implemented by any type of input unit useable by a user to input control signals, such as, buttons, a keyboard, a touch pad, a touch screen, a remote controller, etc.

The speaker 190 outputs sound in response to a control signal provided by the CPU/DSP 170. The sound may be output from the speaker 190 at a time determined by the CPU/DSP 170.

The digital photographing apparatus 100, according to an embodiment of the invention, includes a panoramic photography capability. The panoramic photography is performed in response to the shutter-release input after the digital photographing apparatus 100 enters a panoramic photography mode in response to a user setting. Panoramic photography is a technique of capturing images on a wide format by taking consecutive pictures of adjacent areas, arranging the captured images to be connected to each other, and creating a panoramic image by combining them into a single image. During panoramic photography, moving speed and direction of the digital photographing apparatus 100 affects the success or failure of the panoramic photography. Embodiments of the invention provide one or more guides during panoramic photography so the success rate of panoramic photography may be significantly improved.

Figure 2:
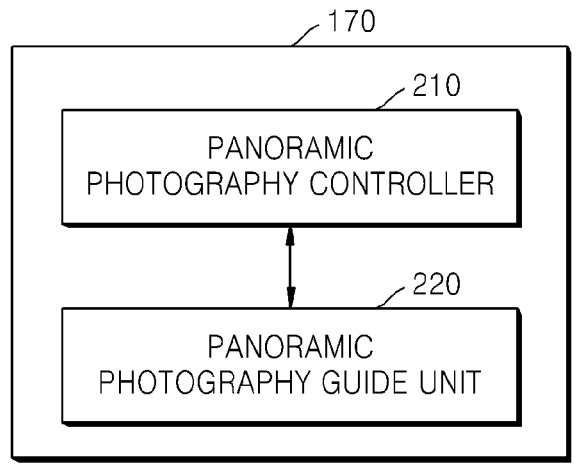
FIG. 2 is a detailed block diagram of the central processing unit (CPU)/digital signal processor (DSP) of FIG. 1, according to an embodiment of the invention.

FIG. 2 is a detailed block diagram of the CPU/DSP 170 of FIG. 1, according to an embodiment of the invention.

In the embodiment, the CPU/DSP 170 includes a panoramic photography controller 210 and a panoramic photography guide unit 220.

The panoramic photography controller 210 controls the photography unit 110 during panoramic photography. During panoramic photography, the photography unit 110 takes consecutive pictures of adjacent areas, and the panoramic photography controller 210 controls the photography unit 110 to capture the images that have been created by the imaging device 118.

The panoramic photography controller 210 may determine a proper capture time with reference to an image input through the photography unit 110. There are a variety of ways of determining the proper capture time with reference to the input image. For example, the proper capture time may be selected by determining whether certain edge areas overlap between a current input image and a previous input image, or whether an edge of a first edge area overlaps with an edge of a second edge area.

In another example, the panoramic photography controller 210 may detect a movement of the digital photographing apparatus 100, and thus determine a proper capture time. Regarding capture timing, when the digital photographing apparatus 100 rotates to a predetermined angle or moves a predetermined distance, it may be determined to capture an input image. The movement of the digital photographing apparatus 100 may be detected with a gyro sensor, a position detect sensor using, for example, a Global Positioning System (GPS) module, a direction sensor, such as an electric compass, etc.

In addition, the panoramic photography controller 210 provides the panoramic photography guide unit 220 with information about capture timing.

The panoramic photography guide unit 220 provides one or more capture indications or guides as images are captured during panoramic photography. The capture guide(s) may be, for example, a capture sound, a predetermined icon, a changing icon, etc. The capture indication(s) or guide(s) may be provided in synchronization with image capture (i.e., image capture times) during panoramic photography.

With the help of the capture indication(s) or guide(s), the user may be more aware of image capture timing during panoramic photography, and may move the digital photographing apparatus 100 with reference to the image capture timing.

When the photography unit 110 performs panoramic photography not based on mechanical movement of a shutter curtain but using an electronic shutter where images are captured according to a control signal supplied to the photography unit 118, the user might not be aware of when images are captured because there is no mechanical shutter movement and thus no shutter sound. In an embodiment, in a case of conducting panoramic photography using an electronic shutter, a fake or simulated shutter movement sound is created and output in synchronization with image capture, or a capture guide may be provided to the user so that the user may made aware of image capture timing even with an electronic shutter.

Figure 3:
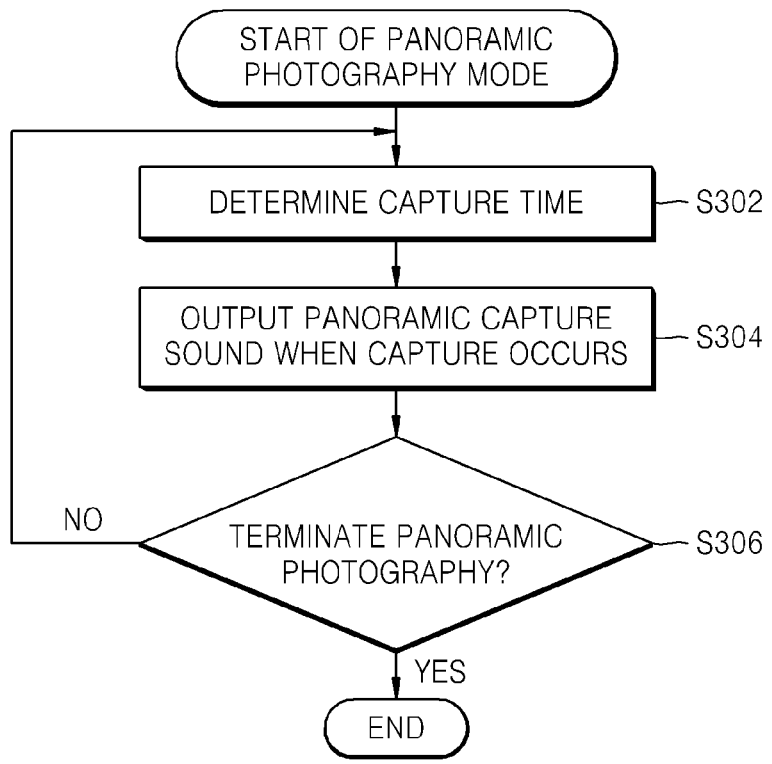
FIG. 3 is a flowchart of a method of controlling the digital photographing apparatus of FIG. 1, according to an embodiment of the invention.

FIG. 3 is a flowchart of a method of controlling the digital photographing apparatus 100 of FIG. 1, according to an embodiment of the invention.

After the digital photographing apparatus 100 has entered a panoramic photography mode and when a shutter-release button is pressed, panoramic photography starts.

The panoramic photography controller 210 determines when to capture an image (i.e., an image capture time) during the panoramic photography in operation S302. For example, the image capture time may be determined with reference to an input image or by detecting a movement of the digital photographing apparatus 100. Each time image capture occurs, a capture guide, which may be a capture sound, is provided in operation S304. The user may easily recognize the image capture time based on the capture guide, and may move the digital photographing apparatus 100 with reference to the image capture time.

If a predetermined requirement for terminating photographing is met, panoramic photography is terminated in operation S306. Otherwise, the next image capture time is determined in operation S302. The predetermined requirement for terminating panoramic photographing may be, for example, when the number of captured images reaches a preset value, when there is no change in input images, when the amount of change in input images is less than a predetermined value, or when no movement of the digital photographing apparatus 100 is detected, etc.

Figure 4:
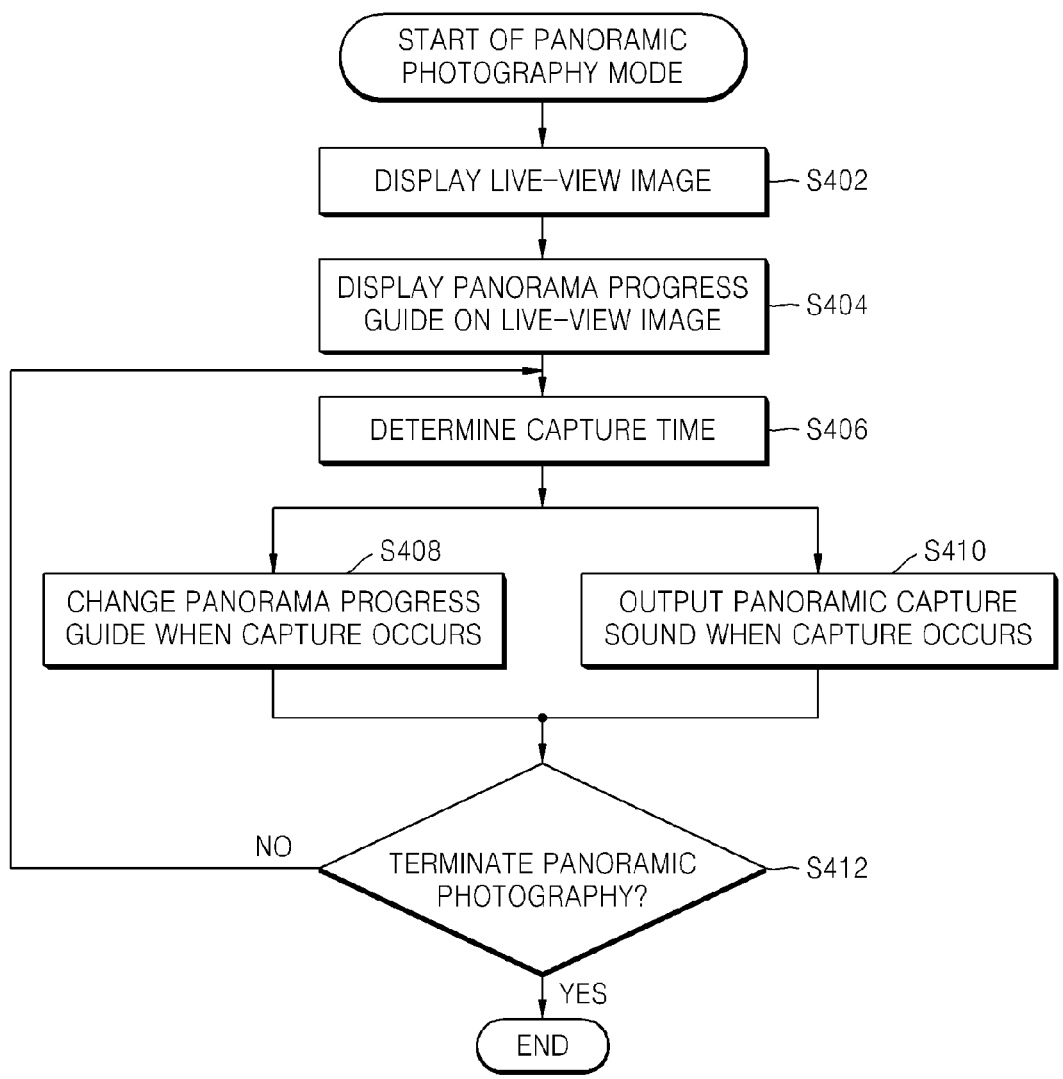
FIG. 4 is a flowchart of a method of controlling the digital photographing apparatus of FIG. 1, according to another embodiment of the invention.

FIG. 4 is a flowchart of a method of controlling the digital photographing apparatus 100 of FIG. 1, according to another embodiment of the invention.

In FIG. 4, a capture guide is displayed in a live-view image during panoramic photography. By displaying the capture guide in the live-view image, the user may proceed with the panoramic photography while checking a current input image and a status of the panoramic photography, thus significantly reducing the failure rate of panoramic photography.

To do this, the live-view image is displayed on the display unit 164 using a current image input to the imaging device 118 in operation S402, and a panoramic progress guide is displayed on the live-view image in operation S404.

Image capture time is determined in operation S406, and the panoramic progress guide is changed (i.e., updated) as images are captured in operation S408, and a capture sound is output in operation S410.

Figure 5:
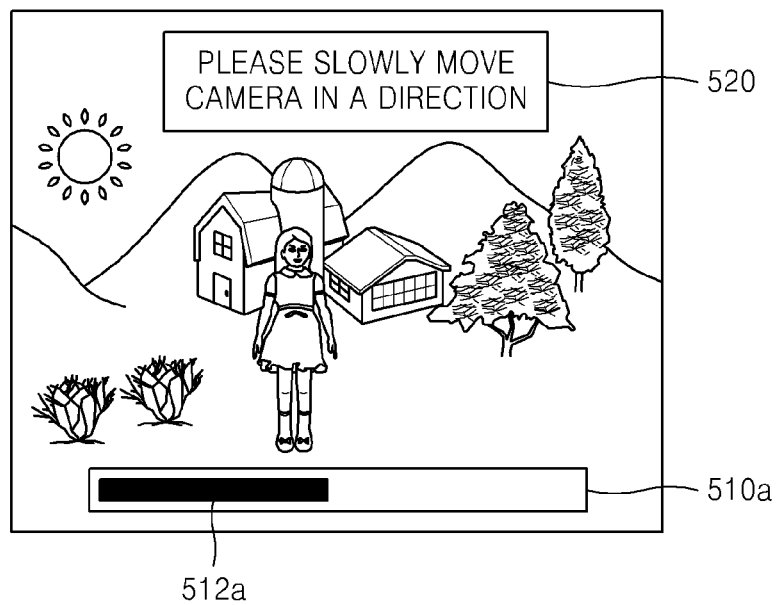
FIGS. 5 and 6 are exemplary screens displaying panorama progress guides in a live-view image.
Figure 6:
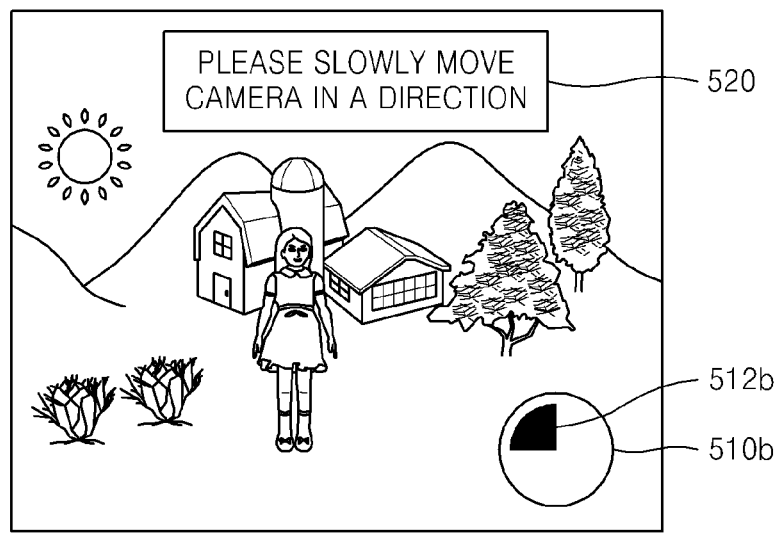

FIGS. 5 and 6 are exemplary screens displaying panoramic progress guides in live-view images.

As illustrated in FIG. 5, a bar-like panoramic progress guide may be displayed on the screen on which the live-view image is displayed. The bar-like panoramic processing guide includes a panoramic progress guide area 510a shaped like a bar, and a panoramic progress bar 512a within the panoramic progress guide area 510a, which is lengthened by a predetermined length as images are captured.

Figure 7:
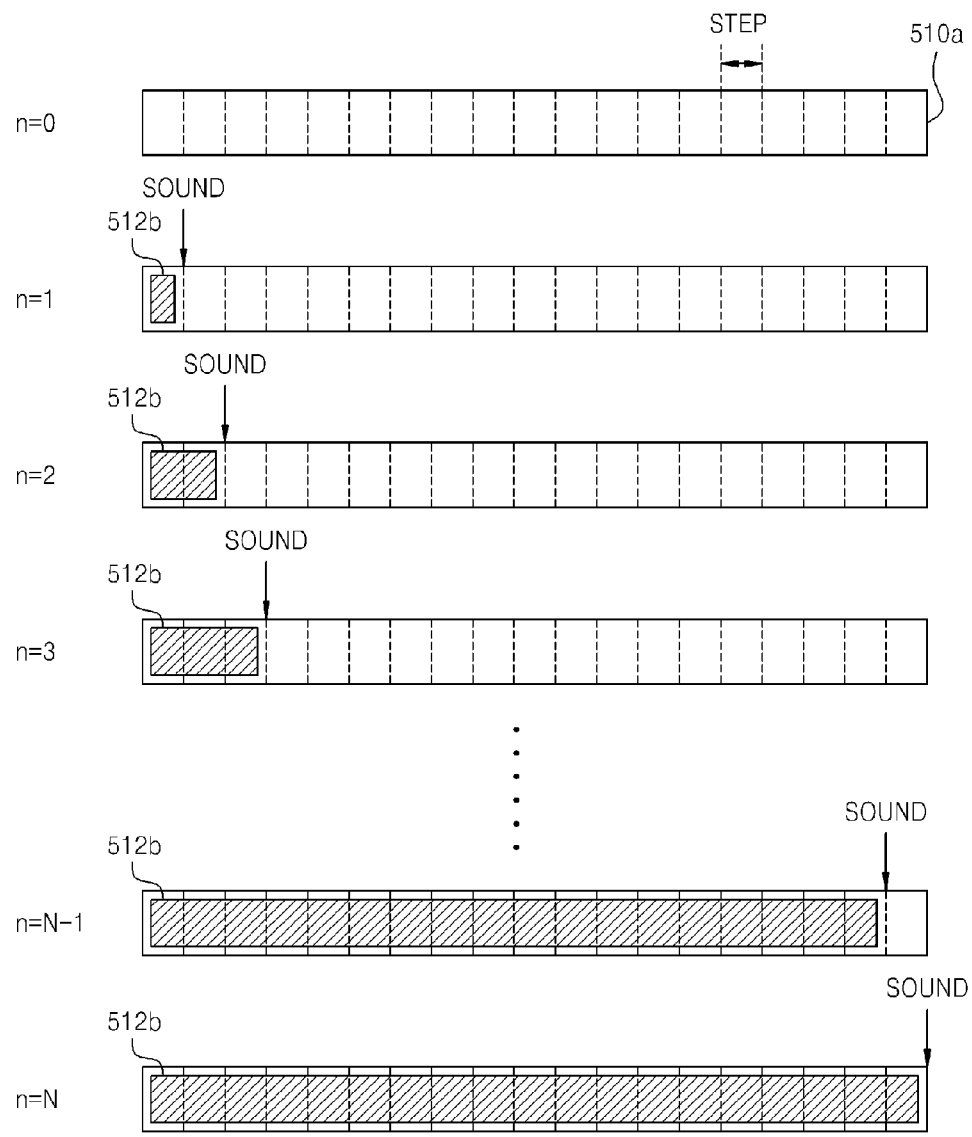
FIG. 7 illustrates updating a bar-like panorama progress guide as images are captured.

FIG. 7 illustrates updates of a panoramic progress guide in a bar that is updated as images are captured. In FIG. 7, n is the number of times that images that have been captured.

As images are captured, the panoramic progress bar 512a is lengthened by a length of STEP within the panoramic progress guide area 510a, as shown in FIG. 7. The length of STEP may be pre-determined. Furthermore, in synchronization with the lengthening of the panoramic progress bar 512a by the length of STEP, a capture sound of SOUND may be output. A length of the panoramic progress guide area 510a may be determined based on the maximum number of times that images may or will captured. In other words, the length of the panoramic progress guide area 510a may be determined depending on a final length that corresponds to the maximum number of images that may be captured.

In a further embodiment, as shown in FIG. 6, a circular panoramic progress guide may be displayed on the screen where the live-view image is displayed. The circular panoramic progress guide includes a panoramic progress guide area 510b shaped like a circle, and a panoramic progress sector 512b within the panoramic progress guide area 510b, which is expanded by an angle of STEP as images are captured.

In addition, as shown in FIGS. 5 and 6, a text-based panoramic photography guide 520 may be displayed along with the live-view image.

Returning to FIG. 4, it is determined whether any of the requirements for terminating panoramic photography is met in operation S412. If no requirement is met, a next capture time is determined in operation S406. Otherwise, if any of the requirements are met panoramic photography is terminated.

Figure 8:
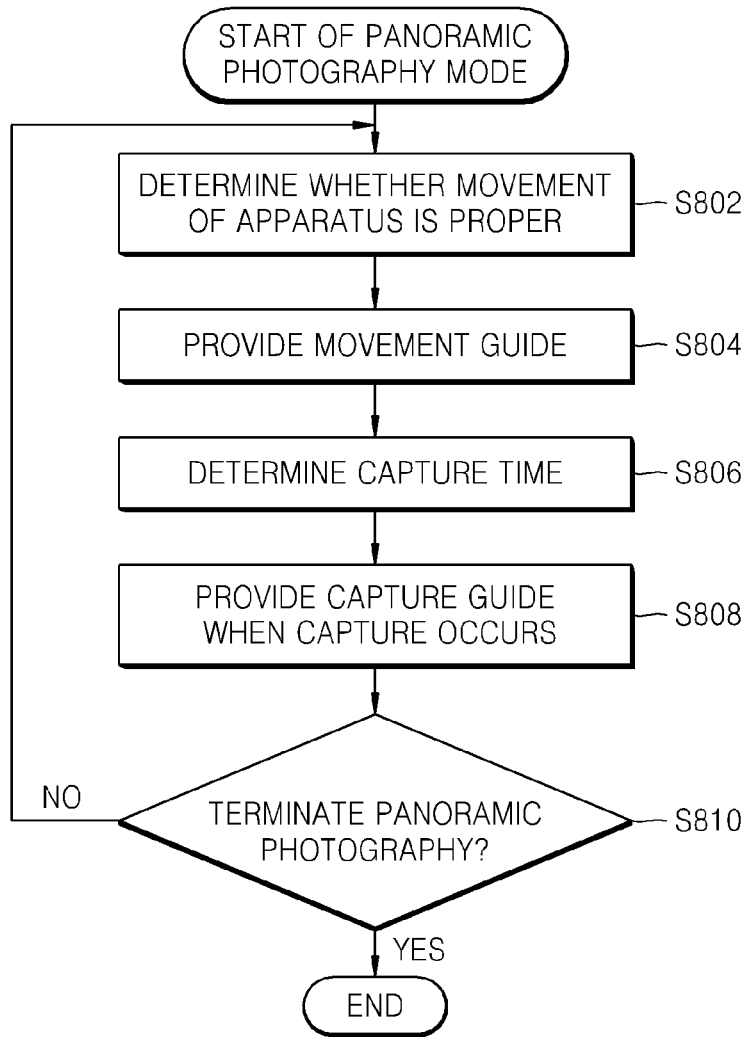
FIG. 8 is a flowchart of a method of controlling the digital photographing apparatus of FIG. 1, according to yet another embodiment of the invention.

FIG. 8 illustrates a flowchart of a method of controlling the digital photographing apparatus 100 of FIG. 1, according to another embodiment of the invention.

In the present embodiment, during panoramic photography, a guide to the movement of the digital photographing apparatus 100 is provided to the user. The movement guide may include, for example, a guide to a moving speed, a guide to a moving direction, etc.

The panoramic photography controller 210 monitors the status of the panoramic photography and assesses the adequacy of the movements of the digital photographing apparatus 100 in operation S802. To do this, the panoramic photography controller 210 may assess the adequacy of a moving speed, a moving direction of the digital photographing apparatus 100, etc.

The adequacy of the moving speed may be assessed by determining whether an overlapping area between successive captured input images is wider or narrower than a predetermined reference value, whether an area where edges overlap is wider or narrower than a predetermined reference value, whether the moving speed of the digital photographing apparatus 100 is outside a predetermined range, etc. For example, if the overlapping area or the area where edges overlap between input images is wider than the predetermined reference value, the moving speed is deemed too slow; if the overlapped area or the area where edges overlap between input images is narrower than the predetermined reference value, the moving speed is deemed too fast. In a case of the digital photographing apparatus 100 being able to detect and calculate its own moving speed, when the moving speed is larger than a predetermined range, the moving speed is deemed too fast; and when the moving speed is less than the predetermined range, the moving speed is deemed too slow.

In the case of the digital photographing apparatus 100 conducting panoramic photography while moving in an X direction, if an overlapping area between successively captured input images slants in a first direction or a second direction opposite to the first direction on the Y axis, or if the movement direction of the digital photographing apparatus 100 has a coordinate on the Y axis, the moving direction may be deemed not adequate.

Based on the result from determining the adequacy of the movement of the digital photographing apparatus 100, a movement guide is provided to the user in operation S804. When the moving speed is deemed too fast, a guide that guides the user to decrease the moving speed is provided. Otherwise, when the moving speed is deemed too slow, a guide that guides the user to increase the moving speed is provided. Additionally, if the moving direction slants in the first direction on the Y axis, a guide that guides the user to move the digital photographing apparatus 100 in the second direction is provided; and if the moving direction slants to the second direction, a guide that guides the user to move the digital photographing apparatus 100 in the first direction is provided.

Figure 9:
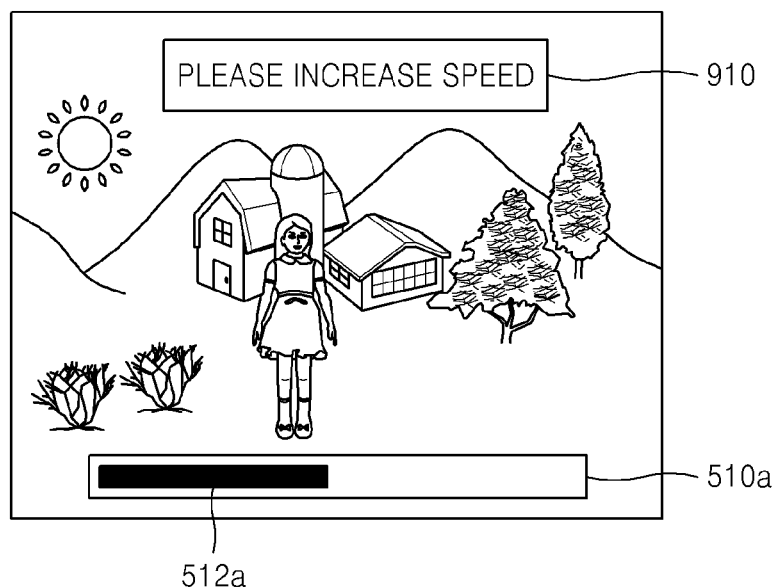
FIG. 9 is an exemplary screen showing a movement guide in a text message.
Figure 10:
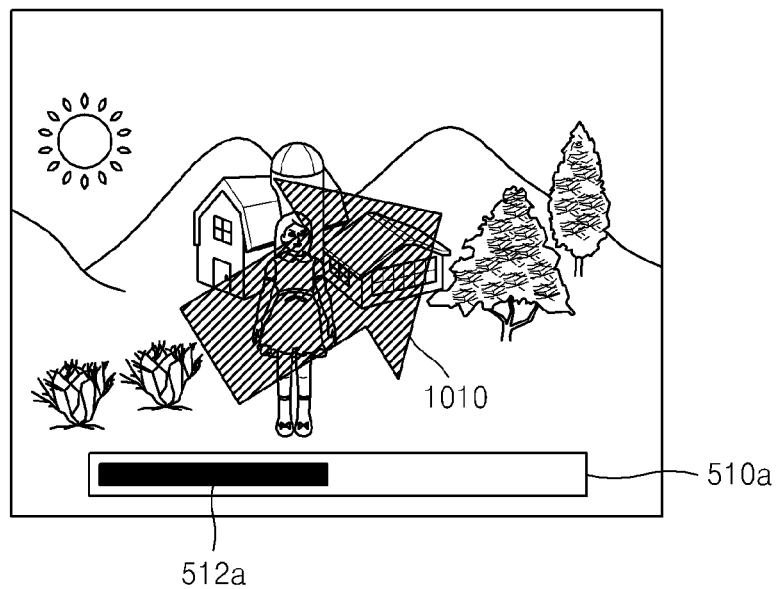
FIG. 10 is an exemplary screen showing a movement guide as an arrow.

FIG. 9 is an exemplary screen showing a movement guide 910 as a text message. FIG. 10 is an exemplary screen showing a movement guide 1010 as an arrow. The length and size of the arrow, the number of arrows, etc. may be a guide to the moving speed of the digital photographing apparatus 100, and the direction of the arrow may be a guide to the direction of the movement of the digital photographing apparatus 100.

Besides the movement guides described above, movement guides may be provided in various other ways, including a movement guide with sound.

Returning to FIG. 8, capture time is determined in operation S806, and a capture guide is provided or updated as images are captured in operation S808. If any of the requirements for terminating panoramic photographing are met in operation S810, panoramic photography is terminated. Otherwise, if any of the requirements are not met in operation S810, the process returns to operation S802, and operations S802 to S808 are repeated.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method comprising:
   activating, a camera included in a portable electronic device;
   obtaining a first image using the camera,
   the obtaining including detecting, using a sensor included in the electronic device, a first movement of the electronic device in relation with the obtaining of the first image; and
   presenting, using a processor included in the electronic device, information to guide a second movement of the electronic device to obtain a second image, the presenting performed based at least in part on the first movement of the electronic device, wherein when a speed of the second movement is faster than a predetermined speed, the processor presents a slowdown guide information associated with the second movement.

2. The method of claim 1, wherein the first image comprises a first image area corresponding to a first object external to the electronic device, and the second image comprises a second image area corresponding to a second object external to the electronic device.

3. The method of claim 1, wherein the second image comprises at least one portion of the first image.

4. The method of claim 1, wherein the presenting comprises:
   presenting, as at least part of the information, an indication indicating a progress of a panorama image using the first image or the second image.

5. The method of claim 1, wherein the presenting comprises:

presenting, as at least part of the information, an indication indicating a direction associated with the second movement.

6. The method of claim 1, wherein the presenting comprises:
displaying, as at least part of the information, a text-based indication or a symbol-based indication via a display operatively coupled with the electronic device.

7. The method of claim 1, wherein the presenting comprises:
displaying, as at least part of the information, an indication via a display operatively coupled with the electronic device, at least one portion of the indication being translucent with respect to the first image or the second image.

8. The method of claim 1, further comprising:
producing, using the processor, a panorama image based at least in part on the first and second images.

9. An apparatus comprising:
a camera to acquire an image;
a sensor; and
a processor configured to:
  obtain a first image using the camera;
  detect, using the sensor, a first movement of the apparatus in relation with the obtaining of the first image;
  present information to guide a second movement of the apparatus to obtain a second image, the presenting based at least in part on the first movement of the apparatus; and
  present a slowdown guide information associated with the second movement when a speed of the second movement is faster than a predetermined speed.

10. The apparatus of claim 9, wherein the first image comprises a first image area corresponding to a first object external to the apparatus, and the second image comprises a second image area corresponding to a second object external to the apparatus.

11. The apparatus of claim 9, wherein the processor is configured to:
present the information based on a determination that the first movement satisfies specified condition.

12. The apparatus of claim 9, wherein the processor is configured to:
present, as at least part of the information, an indication indicating a progress of a panorama image using the first image or the second image.

13. The apparatus of claim 9, wherein the processor is configured to:
present, as at least part of the information, an indication indicating a direction associated with the second movement.

14. The apparatus of claim 9, wherein the processor is configured to:
display, as at least part of the information, a text-based indication or a symbol-based indication via a display operatively coupled with the apparatus.

15. The apparatus of claim 9, wherein the processor is configured to:
display, as at least part of the information, an indication via a display operatively coupled with the apparatus, at least one portion of the indication being translucent with respect to the first image or the second image.

16. The apparatus of claim 9, wherein the processor is configured to:
produce, using the processor, a panorama image based at least in part on the first and second images.

17. A machine-readable storage device storing instructions that, when executed by one or more processors, cause the one or more processors to perform operations comprising:
activating, a camera included in an portable electronic device;
obtaining a first image using the camera, the obtaining including detecting, using a sensor included in the electronic device, a first movement of the electronic device in relation with the obtaining of the first image; and
presenting, using a processor included in the electronic device, information to guide a second movement of the electronic device to obtain a second image, the presenting performed based at least in part on the first movement of the electronic device, wherein when a speed of the second movement is faster than a predetermined speed, the processor presents a slowdown guide information associated with the second movement.

18. An electronic apparatus comprising:
an image sensor;
a display;
a processor configured to:
  obtain a plurality of images using the image sensor to generate a panorama image; and
  display a slowdown guide information on the display if a moving speed exceeds a reference value while obtaining the plurality of images.

19. The apparatus of claim 18, wherein the moving speed is determined based on successive obtained images.

20. The apparatus of claim 18, further comprising a motion sensor to detect a movement of the apparatus,
wherein the moving speed is determined based on a movement detected by the motion sensor.

21. The apparatus of claim 18, wherein the moving speed relates to a movement of the apparatus by a user to capture a subsequent overlapping field of view, and the movement speed is determined based on an overlapping amount of successively obtained images.

22. The apparatus of claim 18, wherein the slowdown guide information comprises a text-based indication.

23. The apparatus of claim 22, wherein the processor is configured to:
display the slowdown guide information with a preview image and a progress guide relating to the panorama image.

* * * * *